US012331909B2

(12) United States Patent
Hasegawa et al.

(10) Patent No.: US 12,331,909 B2
(45) Date of Patent: Jun. 17, 2025

(54) LIGHTING DEVICE

(71) Applicant: Japan Display Inc., Tokyo (JP)

(72) Inventors: Makoto Hasegawa, Tokyo (JP); Nobuyuki Suzuki, Tokyo (JP); Masafumi Okada, Tokyo (JP)

(73) Assignee: Japan Display Inc., Tokyo (JP)

( * ) Notice: Subject to any disclaimer, the term of this patent is extended or adjusted under 35 U.S.C. 154(b) by 203 days.

(21) Appl. No.: 18/338,431

(22) Filed: Jun. 21, 2023

(65) Prior Publication Data

US 2023/0417396 A1 Dec. 28, 2023

(30) Foreign Application Priority Data

Jun. 24, 2022 (JP) ................................. 2022-101734

(51) Int. Cl.

*F21V 13/04* (2006.01)
*F21S 6/00* (2006.01)
*F21V 7/05* (2006.01)
*F21V 7/09* (2006.01)
*F21V 14/00* (2018.01)
*F21Y 115/10* (2016.01)

(52) U.S. Cl.

CPC ................ *F21V 13/04* (2013.01); *F21V 7/05* (2013.01); *F21V 7/09* (2013.01); *F21V 14/003* (2013.01); *F21S 6/003* (2013.01); *F21Y 2115/10* (2016.08)

(58) Field of Classification Search

CPC . G02B 27/0172; G02F 1/13; G02F 1/133607; F21S 6/003; F21V 13/04; F21V 14/003; F21V 7/09; F21V 7/05; F21Y 115/10
See application file for complete search history.

(56) References Cited

U.S. PATENT DOCUMENTS

2013/0010212 A1* 1/2013 Hino ...................... G03B 21/16 348/744
2019/0041642 A1* 2/2019 Haddick ............ G02B 27/0075
2020/0278754 A1* 9/2020 Handa .................... G06V 20/20

FOREIGN PATENT DOCUMENTS

JP 2004-184612 A 7/2004

* cited by examiner

*Primary Examiner* — William J Carter
(74) *Attorney, Agent, or Firm* — Michael Best & Friedrich LLP

(57) ABSTRACT

A lighting device according to the invention includes: a funnel shaped reflector including a first hole in which a light source is disposed, a second hole which emits light, and a reflecting curved surface connecting the first hole with the second hole, a first direction being defined as a direction of a line connecting a center of the first hole with a center of the second hole; a reflection plate, being opposed to the second hole of the funnel shaped reflector, major surface being tilted with a first angle; and a liquid crystal lens including an incident surface and opposing to the reflection plate, a major surface of the incident surface being tilted to the major surface of the reflection plate with a second angle, in which light emitted from the funnel shaped reflector is reflected at the reflection plate, and is emitted from the liquid crystal lens.

13 Claims, 20 Drawing Sheets

LIGHTING DEVICE

CLAIM OF PRIORITY

The present application claims priority from Japanese Patent Application JP 2022-101734 filed on Jun. 24, 2022, the content of which is hereby incorporated by reference into this application.

BACKGROUND OF THE INVENTION

(1) Field of the Invention

The present invention relates to a compact lighting device which can easily change a shape of a light spot.

(2) Description of the Related Art

Among the lighting devices, there exist so called Z-light, desk light, which uses LEDs aligned in line, cylindrical stand light, and so forth.

On the other hand, there exists a demand that emitting light is collimated. Patent document 1 discloses a lighting device to collimate light from the light source by using a rod lens and the like. Patent document 1 also discloses to use collimated light, which is collimated by a rod lens and the like, as a back light for a liquid crystal light valve (a liquid crystal display device).

PRIOR TECHNICAL DOCUMENT

Patent Document

Patent document 1: Japanese patent application laid open No. 2004-184612

SUMMARY OF THE INVENTION

Conventionally used lighting devices as so called Z-light, desk light, which uses LEDs aligned in line, cylindrical stand light, and so forth have rather large sizes, and therefore, it is difficult to use them in a small space. In addition, it is difficult to get collimated light by those lighting devices.

Conventionally, a rod lens and the like have been used to get collimated light. However, since a rod lens and the like are not enough to get fully collimated light, additional optical components as lens are to be needed. As a result, a length of the lighting device in a light emitting direction becomes larger.

A purpose of the present invention is to realize a compact lighting device, specifically a dimension of a lighting device in a light emitting direction is short. Another purpose of the present invention is to realize a lighting device having small light distribution angle even the lighting device is compact. Yet another purpose of the present invention is to realize a lighting device which can easily change a shape of a light spot.

The present invention solves the above explained purposes; an example of concrete structure of the present invention is as follows. A lighting device includes: a funnel shaped reflector including a first hole in which a light source is disposed, a second hole which emits light, and a reflecting curved surface connecting the first hole and the second hole with each other, a first direction being defined as a direction of a line connecting a center of the first hole and a center of the second hole with each other; a reflection plate, being disposed to oppose to the second hole of the funnel shaped reflector, a major surface of the reflecting plate being tilted with a first angle with respect to the first direction; and a liquid crystal lens including an incident surface and opposing to the reflection plate, a major surface of the incident surface of the liquid crystal lens being tilted to the major surface of the reflection plate with a second angle, in which light emitted from the funnel shaped reflector is reflected at the reflection plate, and is emitted from the liquid crystal lens.

BRIEF DESCRIPTION OF THE DRAWINGS

FIG. 27 is viewed from the bottom direction (B direction)

DETAILED DESCRIPTION OF THE PREFERRED EMBODIMENTS

The present invention is explained in detail by the following embodiments.

Embodiment 1

Figure 1:
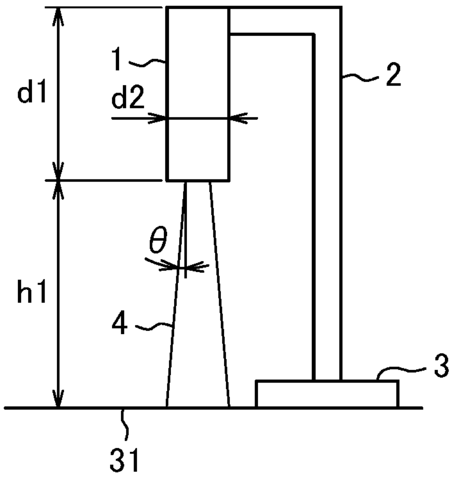
FIG. 1 is a side view of a lighting device according to a comparative example.

FIG. 1 is a comparative example of a lighting device. In the structure of FIG. 1, a lighting device 1 is supported by an arm 2 projected from a base 3. A general shape of the lighting device 1 of FIG. 1 is rectangle having a width of d2 in cross sectional view and a length of d1. A basic structure of the lighting device of FIG. 1 is that: an LED is used as a light source, and the light from the LED is made to be collimated light by funnel shaped reflector having an inner wall of parabolic curved surface.

The funnel shaped reflector is explained later in detail, in any events, the funnel shaped reflector needs a certain length in a light emitting direction to get collimated light. A length of the funnel shaped reflector has a large portion in the length d1 of the lighting device 1. Therefore, a length of the lighting device 1 becomes larger if a light distribution angle 19 of an emitting light 4 is made smaller. Consequently, enough working space cannot be provided, namely, enough length h1, which is a distance between the light emitting surface of the lighting device 1 and the working surface 31, cannot be provided.

Figure 2:
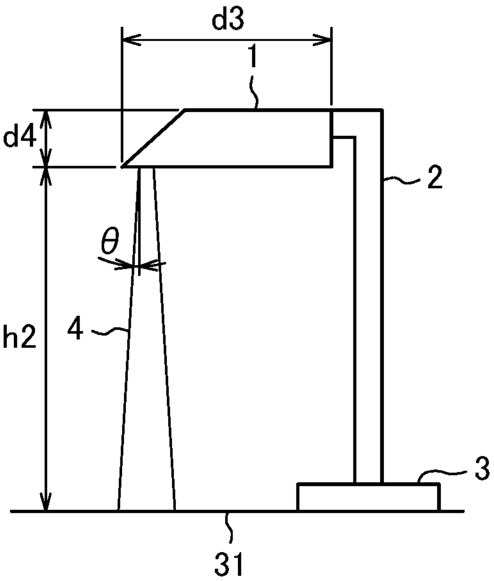
FIG. 2 is a plan view of a lighting device according to embodiment 1.

FIG. 2 is a schematic cross-sectional view of embodiment 1, which counter measures the problem in the structure of FIG. 1. FIG. 2 differs from FIG. 1 in that the lighting device 1 supported by the arm 2 is laid horizontally; the light 4 is emitted from a hole disposed at a side surface of the lighting device 1. A reflection plate which is tilted in 45 degrees with respect to a direction of light is disposed inside of the lighting device 1 to emit light 4 from the side surface of the lighting device 1, accordingly, an outer shape of the lighting device 1 has a tilting surface.

An enough distance can be provided between the lighting device 1 and the working surface 31 according to the structure of FIG. 2. When a small light distribution angle 19 of the emitting light 4 is needed, a length d3 of the lighting device 1 is elongated; in the structure of FIG. 2, however, a width d4 of the lighting device 1 need not be changed, consequently, a distance h2 between the lighting device 1 and the working surface 31 is not changed.

Figure 3:
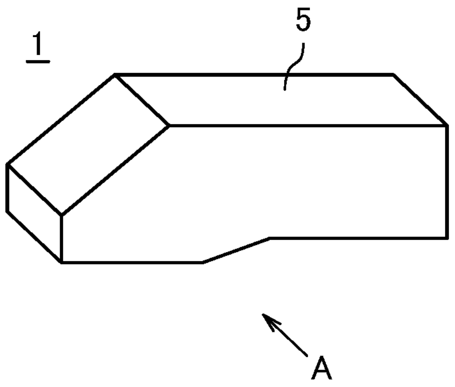
FIG. 3 is a perspective view in which the lighting device is viewed from a top direction.
Figure 4:
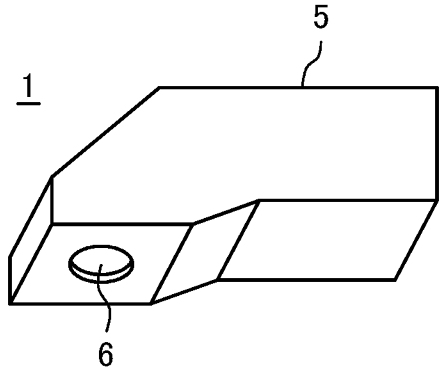
FIG. 4 is a perspective view in which the lighting device is viewed from a bottom direction.

FIG. 3 is a perspective view of FIG. 2 viewed from diagonally upward. In FIG. 3, the LED as a light source and a funnel shaped reflector are located in a housing 5 of the lighting device 1; a reflection plate to change a direction of light is located at the diagonal portion of the housing. FIG. 4 is a perspective view of FIG. 3 when viewed from direction of A. FIG. 4 shows a bottom shape of the lighting device 1. In FIG. 4, a circular emitting hole 6 is located at a bottom of the lighting device 1. As will be explained later, a liquid crystal lens is located at immediately upward of the light emitting hole 6 to change a shape of the emitting light 4.

Figure 5:
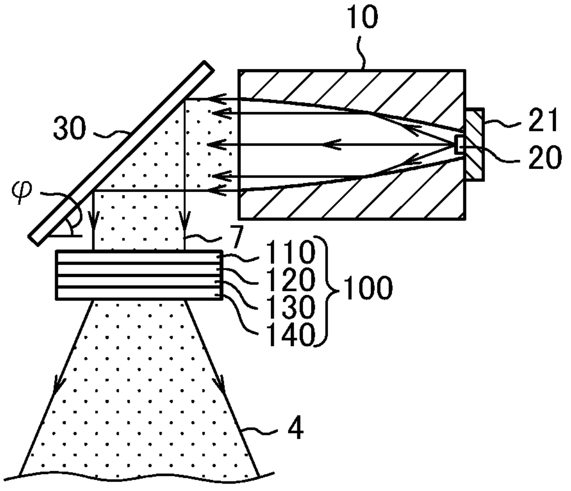
FIG. 5 is a cross sectional view to show a structure of embodiment 1.

FIG. 5 is a cross sectional view to show a structure of embodiment 1; and a cross sectional views to show components disposed in the housing 5. In FIG. 5, an LED 20, which is a light source, is inserted in a hole for an LED of the funnel shaped reflector 10. The LED 20 is disposed on a LED substrate 21. The light emitted from the LED 20 is collimated parallel with a light axis by a parabolic reflecting surface formed in inner surface of the funnel shaped reflector 10, and is directed to the reflection plate 30 through the emitting hole of the funnel shaped reflector 10.

A direction of the light is bent in 90 degrees by the reflection plate and the light goes down in FIG. 5. The bent direction can be other than 90 degrees according to a usage of the lighting device 1. A bent direction of the light is controlled by tilting angle $\phi$ of the reflection plate 30 shown in FIG. 5. The light 7, reflected by the reflection plate enters the liquid crystal lens 100 and gets lens effect; after being modified by the lens effect, the light 7 is emitted as the emitting light 4 from the emitting hole 6 of the lighting device 1. In FIG. 5, the light 7 entered the liquid crystal lens 100 gets a diverging effect. The liquid crystal lens 100 in FIG. 5 is a lens set constituted from four liquid crystal lenses.

In FIG. 5, an angle $\phi$ between a major surface of the reflection plate 30 and a major surface of the liquid crystal lens 100 is 45 degrees; however, the angle $\phi$ is not necessarily 45 degrees, but can be other angles according to usage of the lighting device.

A thickness of the lighting device in a direction of emitting light can be made smaller according to the structure of FIG. 5. In addition, an effect of the liquid crystal lens 100 can be further enhanced by disposing the liquid crystal lens 100 after the light is bent by the reflection lens not between the reflection plate 30 and the funnel reflector 10. Further, a distance between the reflection plate 30 and the light emitting hole of the funnel shaped reflector 10 can be made smaller, thus, a liberty in optical designing can be increased.

Figure 6:
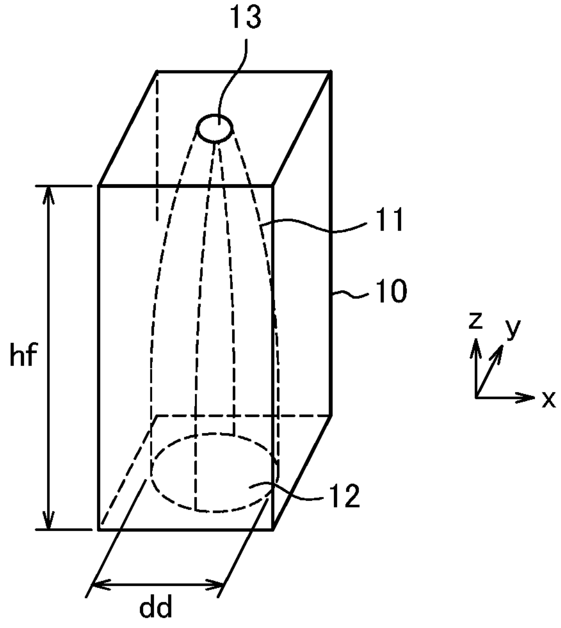
FIG. 6 is a perspective view of a funnel shaped reflector.

FIG. 6 is a perspective view of the funnel shaped reflector 10. Although the funnel shaped reflector 10 is laid horizontally in FIG. 5, the funnel shaped reflector 10 is laid vertically in FIG. 6. An outer shape of the funnel shaped reflector 10 is rectangular. A funnel shaped recess, having a wall of parabolic surface 11, is famed in the funnel shaped reflector 10. A cross sectional view of the recess in x-y plane is a circle, and a cross sectional view of the recess in parallel to x axis is a parabolic. The light is collimated in parallel to the z axis direction due to the parabolic surface. By the way, the parabolic surface in this specification includes even when a part of the inner wall is parabolic.

In FIG. 6, hole 13 for the LED 20 is provided at the top of the rectangular 10. As to a small LED, a size of 1.5 mm squares is commercially available. The LED hole 13 can be a simple hole in which such a small LED is inserted. A light emitting hole 12 is famed at a bottom of the rectangular 10. The light emitting hole 12 is a circle, a diameter dd of which is, e.g., 6.5 mm.

The hole 13 for the LED and the emitting hole 12 are connected with each other by parabolic surface 11. The light emitted from the LED 20 is collimated by the parabolic surface and is emitted from the emitting hole 12. In FIG. 6, a larger ratio (hf/dd), in which dd is a diameter of the emitting hole 12 and hf is a height of the funnel shaped reflector 10, gives more collimated light, that is to say, a light of smaller light distribution angle. The value of (hf/dd) may be called as an aspect ratio.

The aspect ratio is preferably two or more, more preferably, three or more, and further preferably four or more. Since the funnel shaped reflector 10 is laid horizontally as shown in FIG. 5, a height of the lighting device is not changed even an aspect ratio is made larger. Therefore, the value h2 shown in FIG. 2 can be maintained.

Back to FIG. 5, a shape of the light emitted from the lighting device 1 is changed by the liquid crystal lens 100. Preferably the light enters the liquid crystal lens 100 is collimated so that the shape of the light precisely controlled by the liquid crystal lens 100. The funnel shaped reflector 10, even it has smaller outer shape, can emit light of small light distribution angle, therefore, it is suitable to the optical structure of FIG. 5.

In FIG. 5, a direction of the light emitted from the funnel shaped reflector 10 is bent 90 degrees by the reflection plate 30. It is empirically confirmed that a light distribution angle is not substantially changed even it is reflected by the reflection plate 30. By the way, an angle between the major surface of the reflection plate 30 and the light axis is 45 degrees in FIG. 5, however, the angle can be changed according to a usage of the lighting device.

The light reflected at the reflection plate 30 enters the liquid crystal lens 100; a shape of the light is changed to various shapes according to a usage the liquid crystal lens 100, which can provide a various lens actions. The liquid crystal lens 100 is a set of four liquid crystal lenses of a first liquid crystal lens 110, a second liquid crystal lens 120, a third liquid crystal lens 130, and a fourth liquid crystal lens 140.

In the structure of FIG. 5, the light enters the liquid crystal lens 100 is a collimated light by the funnel shaped reflector 10; therefore, the light maintains a small light distribution angle even it is reflected at the reflection plate 30. Thus, a size of the liquid crystal lens 100 is not needed to be made larger. By the way, each of the liquid crystal lens 110, 120, 130 and 140 is constituted from a TFT substrate and a counter substrate, a thickness of each of the substrates is 0.5 mm; therefore, a thickness of each of the liquid crystal lens is 1 mm, consequently a total thickness of the stacked four liquid crystal lenses is approximately 4 mm.

Figure 7:
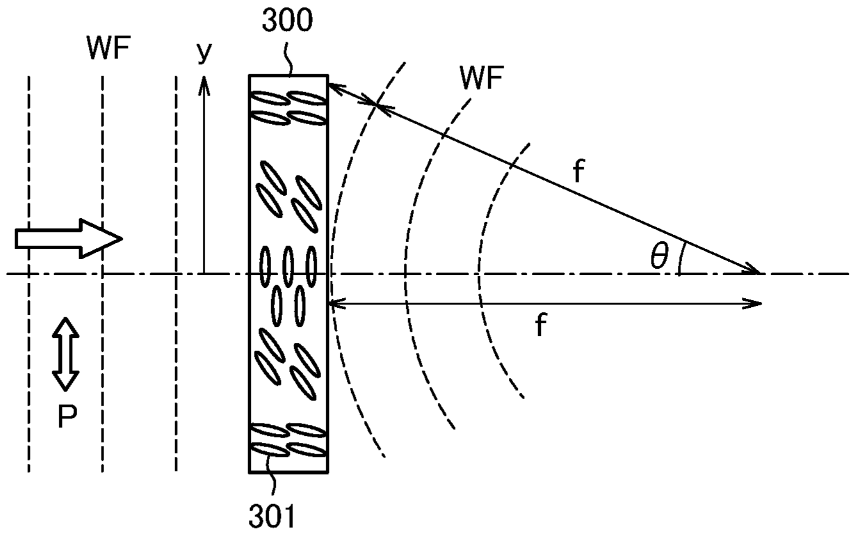
FIG. 7 is a cross sectional view to explain an action of a liquid crystal lens.

FIG. 7 is a cross sectional view which shows function of a liquid crystal lens 100. In FIG. 7, collimated light enters a liquid crystal layer 300 from left hand side. P in FIG. 7 means a polarized direction of impinging light. Generally, the polarized direction of normal light distributes randomly, however, the liquid crystal has an anisotropy in refraction; therefore, FIG. 7 shows a function of the liquid crystal layer 300 to the light polarized in P direction.

In FIG. 7, liquid crystal molecules 301 align as that a tilting angle becomes larger in going to periphery of the liquid crystal layer 300 due to electrical field from the electrodes. A liquid crystal molecule 301 has an elongated shape; effective refractive index in the long axis is larger than effective refractive index in the short axis in the liquid crystal molecule 301; therefore, refractive index in the liquid crystal layer 300 becomes larger in going to periphery, thus, a convex lens is formed. In FIG. 7, the broken line is a light wave front WF, and f is a focus distance.

Figure 8:
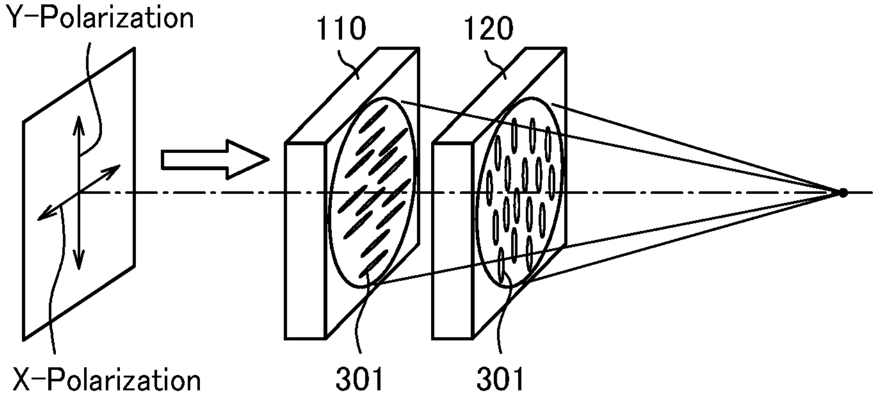
FIG. 8 is another cross-sectional view to explain an action of the liquid crystal lens.

Since the liquid crystal lens acts only to the polarized light, a second liquid crystal lens, which acts on a light polarized orthogonally to the light on which the first liquid crystal lens acts, is necessary. FIG. 8 is an exploded perspective view which shows the lens structure. In FIG. 8, the parallelogram in left hand side is the wave front of light. In FIG. 8, the light polarized in x direction and the light polarized in y direction enters the liquid crystal layer 300. The first liquid crystal lens 110 acts on the light polarized in x direction; the second liquid crystal lens 120 acts on the light polarized in y direction.

In FIG. 8, initial alignment directions of the liquid crystal molecules 301 are orthogonal between in the first liquid crystal lens 110 and the second liquid crystal lens 120. The initial alignment direction of the liquid crystal molecule 301 is determined by alignment direction of the alignment film famed in the liquid crystal lens. That is to say, in FIG. 8, the alignment directions of the alignment films of the substrates on the side from which the light enters from outside in the two liquid crystal lenses 110 and 120, are orthogonal to each other between the two liquid crystal lenses.

Figure 9:
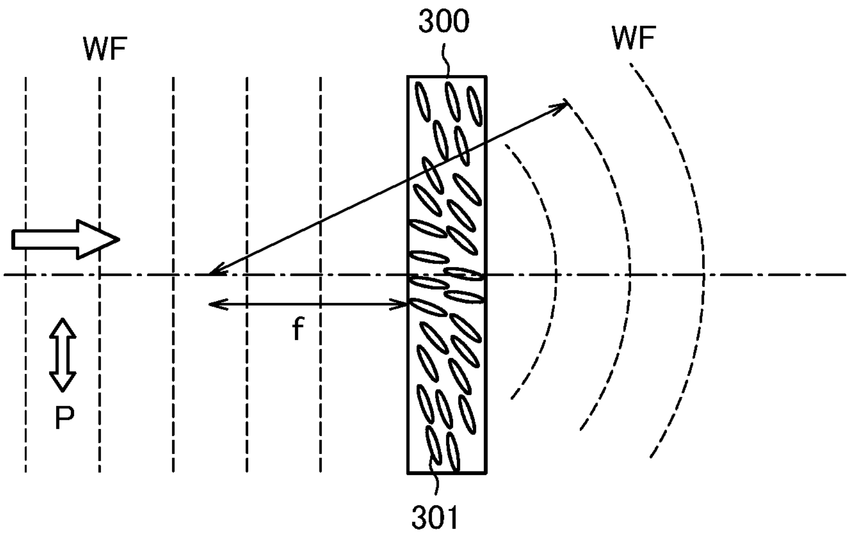
FIG. 9 is yet another cross-sectional view to explain an action of the liquid crystal lens.

FIG. 9 shows how to form a concave lens by liquid crystal lens. In FIG. 9, the light having the wave front WF, which is parallel to the liquid crystal layer 300, and polarized in one direction enters the liquid crystal layer 300 from left hand side. In FIG. 9, the liquid crystal molecules 301 align as that the tilting angle becomes smaller in going to periphery of the liquid crystal layer 300 due to electrical field from the electrodes. Due to the above lens structure, the wave front WF of light, which has passed the liquid crystal layer 300, becomes a curve as shown by broken line in FIG. 9, thus, concave lens is formed. In the meantime, in the case of concave lens also, two liquid crystal lenses are necessary as explained in FIG. 8.

Figure 10:
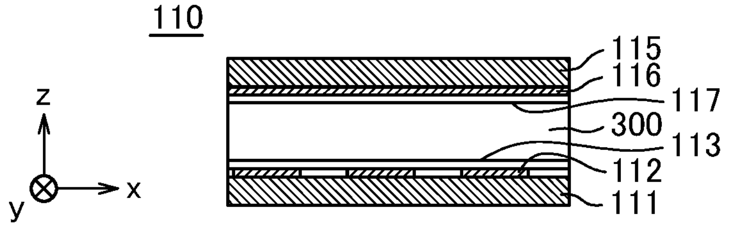
FIG. 10 is a cross sectional view of a structure of embodiment 1.

FIG. 10 is a detailed cross-sectional view of the liquid crystal lens 110. In FIG. 10, a first electrode 112 is formed on the TFT substrate 111 and a first alignment film 113 is famed covering the first electrode 112. The polarizing direction of the light which is modulated by the liquid crystal lens is determined by an alignment direction of the first alignment film 113. A second electrode 116 is famed inside of the counter substrate 115; a second alignment film 117 is formed covering the second electrode 116. A relation between the alignment direction of the first alignment film 113 and the alignment direction of the second alignment film 117 is determined by what kind of liquid crystal is used. The liquid crystal layer 300 is sandwiched between the TFT substrate 111 and the counter substrate 115.

Figure 11:
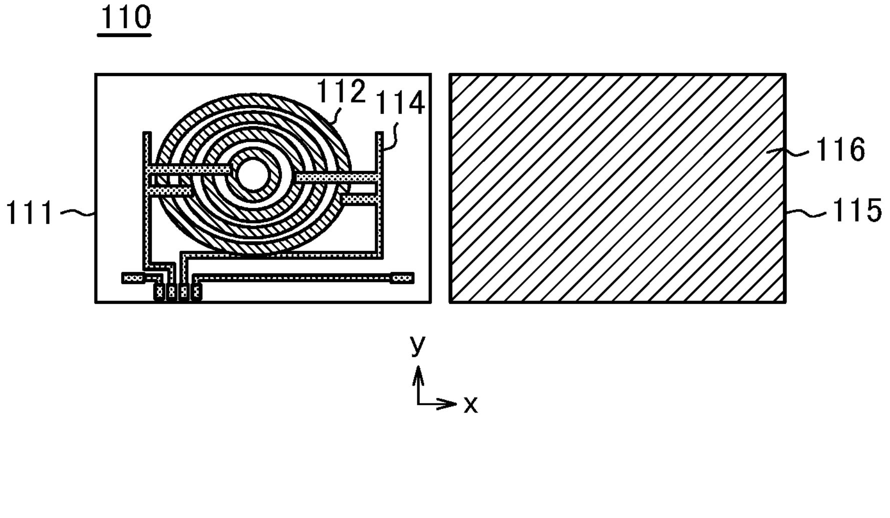
FIG. 11 is a set of plan views of the electrodes of a first liquid crystal lens.

The figure of lefthand side in FIG. 11 is a plan view of the first electrode 112 famed on the TFT substrate 111. The first electrodes 112 are shaped in concentric circles. A lead wiring 114 is connected to each of the circle shaped electrodes 112 to supply voltages. The figure of righthand side in FIG. 11 is a plan view of the second electrode 116 famed on the counter substrate 115. The second electrode 116 is a plane electrode, which is formed on approximately entire area of the counter substrate 115.

In FIG. 11, lenses of various intensity can be famed by changing voltages between the first electrode 112 and the second electrode 116. In the example of the liquid crystal lens in FIGS. 10 and 11, the first electrode 112 is famed in concentric circles, thus, it has a feature that a circular lens is easily formed.

The liquid crystal lens 110 explained in FIGS. 10 and 11 is a lens which acts on light polarized in one direction, e.g., polarized light PX. The light from the LED, however, polarized in all the directions; therefore, it is necessary at least another lens which acts on the light PY which is polarized orthogonal to the polarized direction of the light PX.

Figure 12:
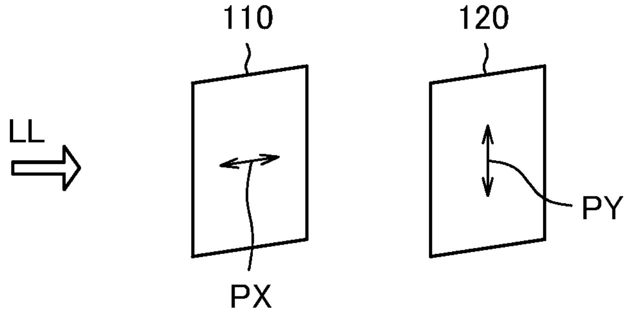
FIG. 12 is a perspective view to show actions of the first liquid crystal lens and a second liquid crystal lens.

FIG. 12 is a perspective view to show this structure. In FIG. 12, the light LL from the LED enters from left hand side; the light polarized in PX direction experiences a lens action from the first liquid crystal lens 110. The light polarized in PY direction does not experience a lens action from the first lens 110. The light polarized in PY direction experiences a lens action from the second liquid crystal lens 120. The light polarized in PX direction does not experience a lens action from the second liquid crystal lens 120. As a result, both the light polarized in PX direction and the light polarized in PY direction experience the lens action.

Figure 13:
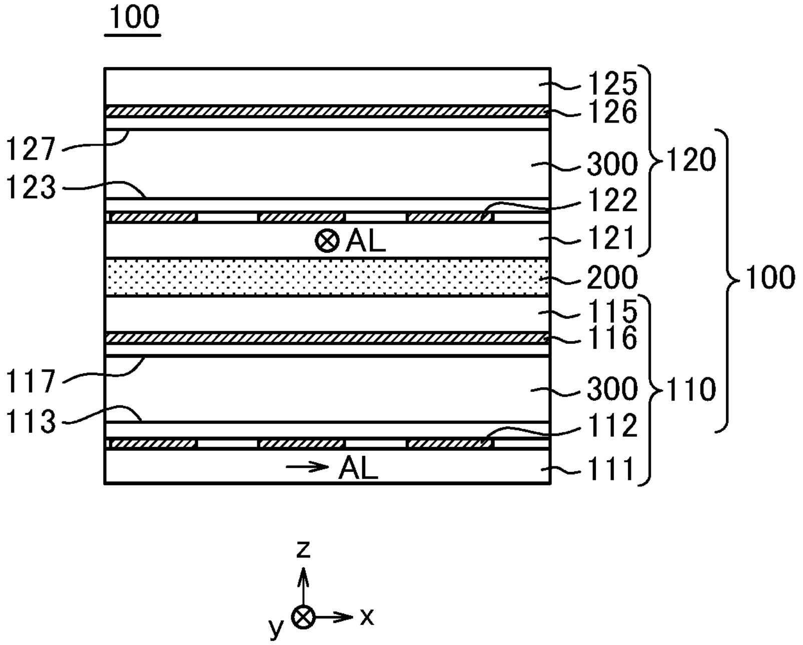
FIG. 13 is a cross sectional view in which the first liquid crystal lens and the second liquid crystal lens are stacked each other.

FIG. 13 is a cross sectional view in which the first liquid crystal lens 110 and the second liquid crystal lens 120 are stacked on top of each other. The first liquid crystal lens 110 and the second liquid crystal lens 120 are adhered to each other with transparent adhesive 200. In FIG. 13, the electrode structure of the second liquid crystal lens 120 is the same as that of the first liquid crystal lens 110. That is to say, in the second liquid crystal lens 120, the third electrode 122 is fainted on the TFT substrate 121, a third alignment film 123 is formed on the third electrode 122; the fourth electrode 126 is famed on the counter substrate 125, a fourth alignment film 127 is famed on the fourth electrode 126.

Alignment directions of the alignment layers 113 and 123 are different between the first liquid crystal lens 110 and the second liquid crystal lens 120. In FIG. 13, AL shows an alignment direction of the alignment layer 113. In FIG. 13, the alignment direction of the first alignment film 113 famed on the TFT substrate 111 in the first liquid crystal lens 110 is, for example, the x direction; the alignment direction of the third alignment film 123 famed on the TFT substrate 121 in the second liquid crystal lens 120 is, for example, the y direction. That is to say, both the light polarized in the x direction and the light polarized in the y direction can experience lens action by two liquid crystal lenses 110 and 120.

In the meantime, an alignment direction of the second alignment film 117 formed on the counter substrate 115 and an alignment direction of the fourth alignment film 127 fainted on the counter substrate 125 are determined what kind of liquid crystal is used as a liquid crystal layer 300. That is to say, in the first liquid crystal lens 110, the second alignment layer 117 can be aligned in the same alignment direction as the first alignment layer 113 or can be aligned in the direction orthogonal to the alignment direction of the first alignment layer 113. The relation between the third alignment film 123 and the fourth alignment film 127 in the second liquid crystal lens 120 is the same.

In the meantime, since the light from the LED 10 is polarized in all the directions, there is a chance that the lens effect, only for the light polarized in PX or PY direction, is not enough. In that case, the liquid crystal lens 130, which acts on the light polarized in P45 direction, which is 45 degrees from the x direction, and the liquid crystal lens 140, which acts on the light polarized in P135 direction, which is 135 degrees from the x direction, are added.

Figure 15:
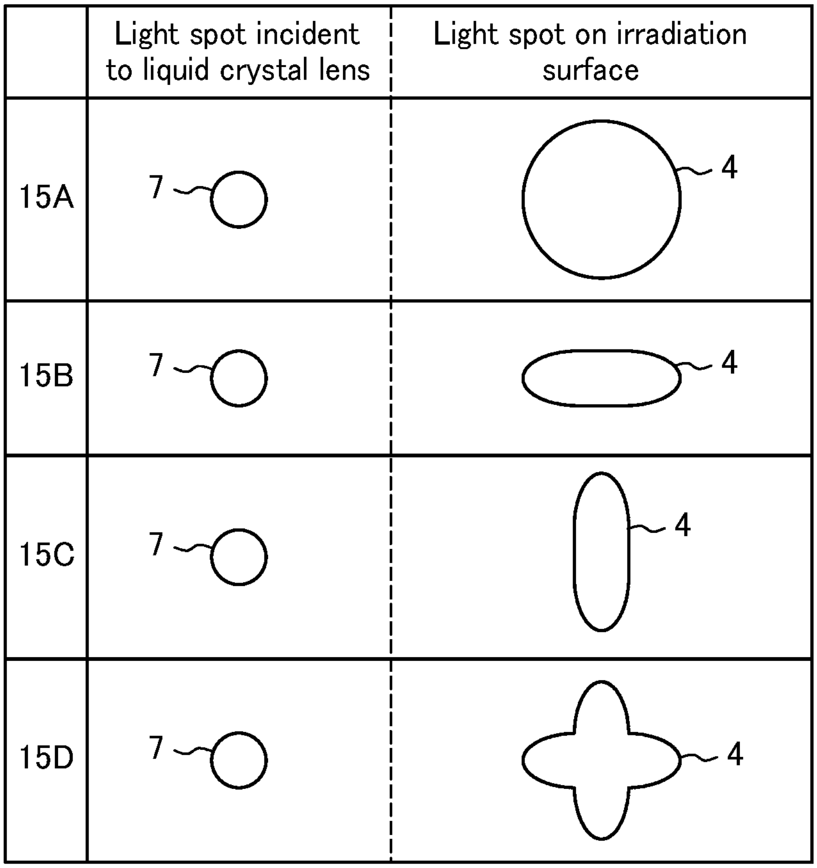
FIG. 15 is a table to show various lens actions according to the liquid crystal lens of embodiment 1.

The liquid crystal lens can have effects not only diverging and converging the light spot but also can change a shape of the light spot. The table in FIG. 15 shows representative examples. In FIG. 15, 15A shows that a beam of small circle is changed to a large circle, 15B shows that a beam of small circle is elongated only in horizontal direction, 15C shows that a beam of small circle is elongated only in vertical direction, 15D shows that a beam of small circle is elongated in cross shape.

Figure 16:
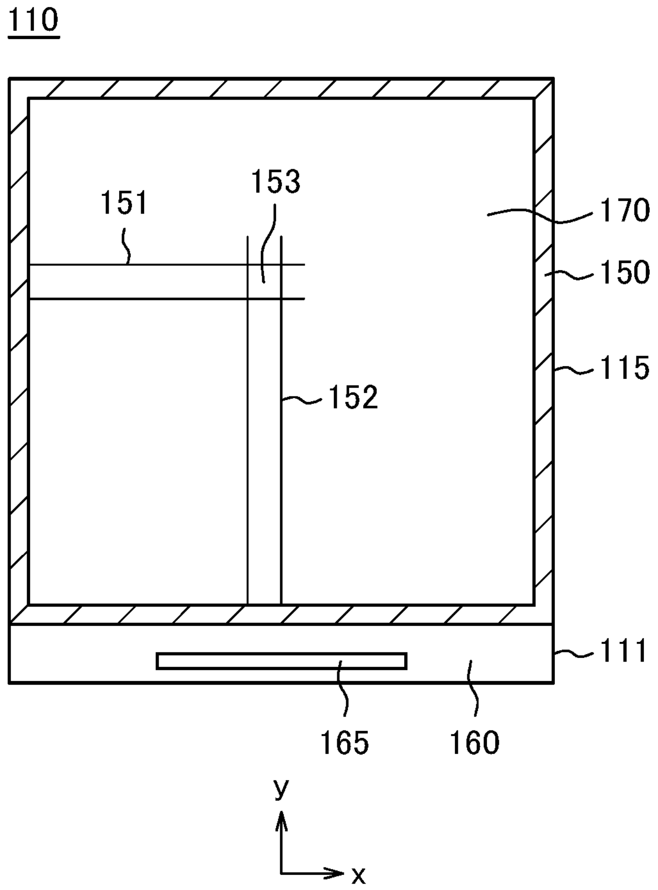
FIG. 16 is a plan view of the electrode structure of the liquid crystal lens according to another example.

The effect of ISA can be performed by a lens structure of FIG. 11; however, the effects of 15B, 15C, 15D and so forth cannot be dealt with the lens structure of FIG. 11. FIG. 16 is a plan view of the liquid crystal lens 110, which can have such effects. In FIG. 16, The TFT substrate 111 and the counter substrate 115 are adhered to each other at periphery through the sealing material 150, and the liquid crystal is sealed therein. The region, in which the TFT substrate 111 and the counter substrate 115 overlap, is a lens area 170.

The TFT substrate 111 is made larger than the counter substrate 115, the TFT substrate 111, which does not overlap with the counter substrate 115, is a terminal area 160. The driver IC 165 and so forth are disposed on the terminal area 160.

In the lens area 170 in FIG. 16, the scanning lines 115 extend in the horizontal direction (the x direction) and are arranged in the longitudinal direction (the y direction); the signal lines 152 extend in the longitudinal direction and are arranged in the horizontal direction. A lens element 153 including a lens element electrode (herein after simply called as an element electrode) is famed in an area surrounded by the scanning lines 151 and the signal lines 152. The light is refracted by aligning the liquid crystal molecules in certain directions by applying a voltage between the element electrode and the common electrode famed on the counter substrate 115.

Figure 17:
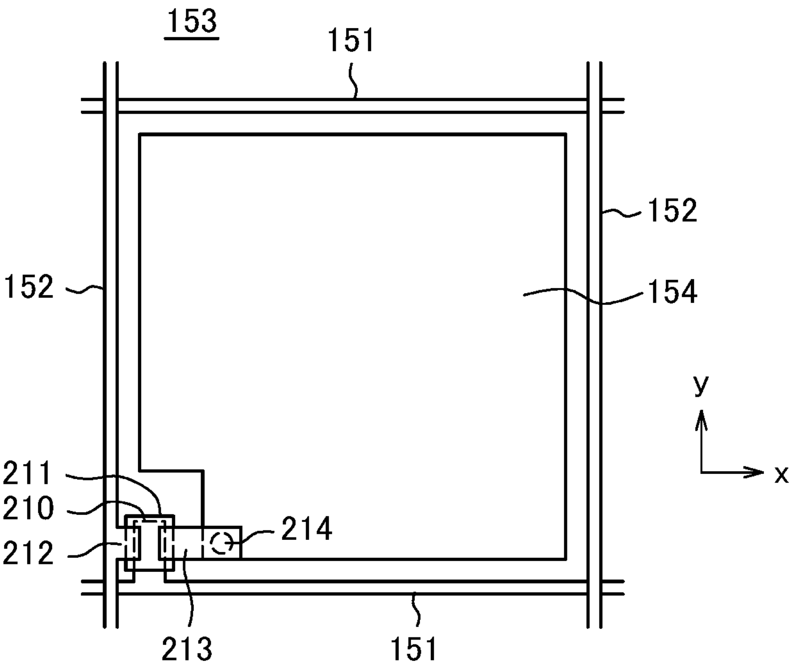
FIG. 17 is a plan view of the lens element in FIG. 16.

FIG. 17 is a plan view of the lens element 153. In FIG. 17, the element electrode 154 is formed in an area surrounded by the scanning lines 151 and the signal lines 152. The TFT (Thin Film Transistor) is famed between the signal line 152 and the element electrode 154 and is switched by the scanning signal. The TFT is formed from the gate electrode 210, which is branched from the scanning line 151, the semiconductor film 211, the drain electrode 212 which is branched from the signal line 152, and the source electrode 213; the source electrode 213 is connected with the element electrode 154 through the through hole 214. Other liquid crystal lenses 120, 130, and 140 have the same structure as the liquid crystal lens 110.

Figure 18:
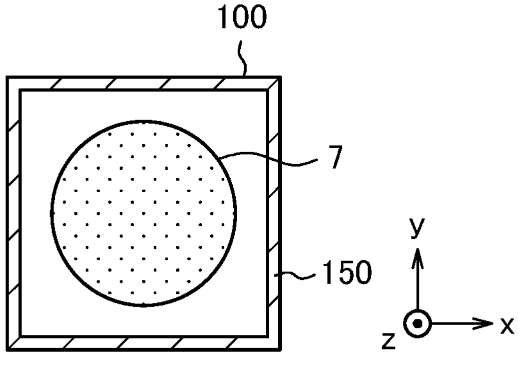
FIG. 18 is a plan view of the incident light and the liquid crystal lens.
Figure 19:
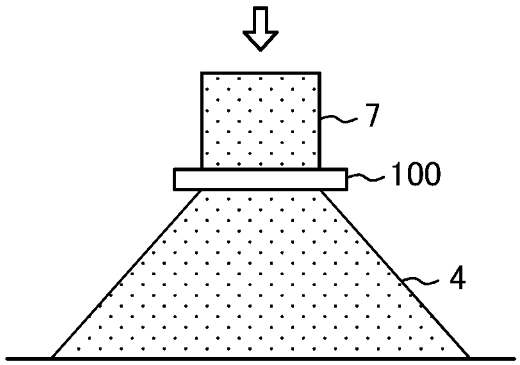
FIG. 19 is a cross sectional view to show the liquid crystal lens that acts as a divergent lens in a certain direction.
Figure 20:
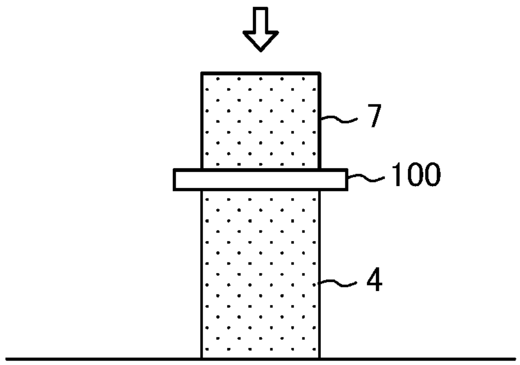
FIG. 20 is a cross sectional view to show the liquid crystal lens that does not act as a divergent lens in a orthogonal direction to the certain direction of FIG. 19.

FIG. 18 is a plan view which shows that the light 7 from the reflection plate is incident to the liquid crystal lens 100 as FIG. 5; circular light 7 is incident to the rectangle liquid crystal lens 100. If the liquid crystal lens 100 acts on the light 7 to diverge in the horizontal direction as shown in FIG. 19, and the liquid crystal lens 100 does not act on the light 7 in the vertical direction as shown in FIG. 20, a horizontally elongated light spot as FIG. 15B can be famed. In the meantime, the white arrow in FIGS. 19 and 20 means a propagating direction of the light.

On the other hand, if the vertically elongated light spot as figure is required, the liquid crystal lens 100 is made to act on the light to diverge in the y direction as shown in FIG. 19, and the liquid crystal lens 100 is made not to act on the light in the x direction as shown in FIG. 20.

Figure 21:
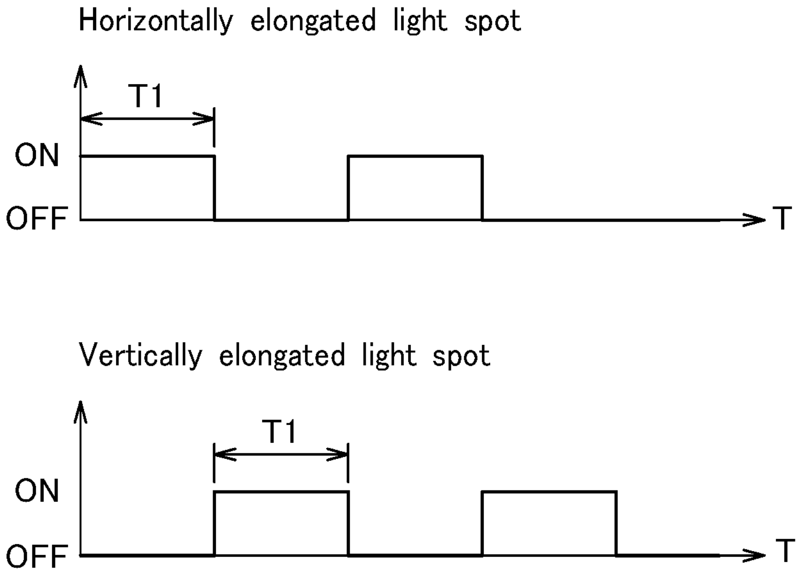
FIG. 21 is a chart when the liquid crystal lens is driven by time divisional method.

When a cross shaped light spot as shown in FIG. 15D is needed, it is difficult to apply the same method as when the light spots 15B and 15C are famed. One method to realize a cross shaped light spot as FIG. 15D is to adopt a time divisional driving method, in which the horizontally elongated light spot as FIG. 15B is famed in one time and the vertically elongated light spot as FIG. 15C is famed in another time. FIG. 21 is an example of time divisional driving method to form the cross shaped light spot. As shown in FIG. 21, a horizontally elongated light spot is formed at the first time of T1, and a vertically elongated light spot is famed at the subsequent time of T1. T1 is chosen as that flicker is not conspicuous.

Embodiment 2

Sometimes a deflection of light beam is desired for the liquid crystal lens 100 not only a lens action as divergence or convergence of the light beam. Below is a mechanism that a pair of liquid crystal lenses are used for a deflection of the light which has two polarized directions. Each of the liquid crystal lenses can use the structure as explained in FIGS. 16 and 17. The top figure of FIG. 22 is a cross sectional view which explains an action of the first liquid crystal lens 110 in a pair of the liquid crystal lenses.

Figure 22:
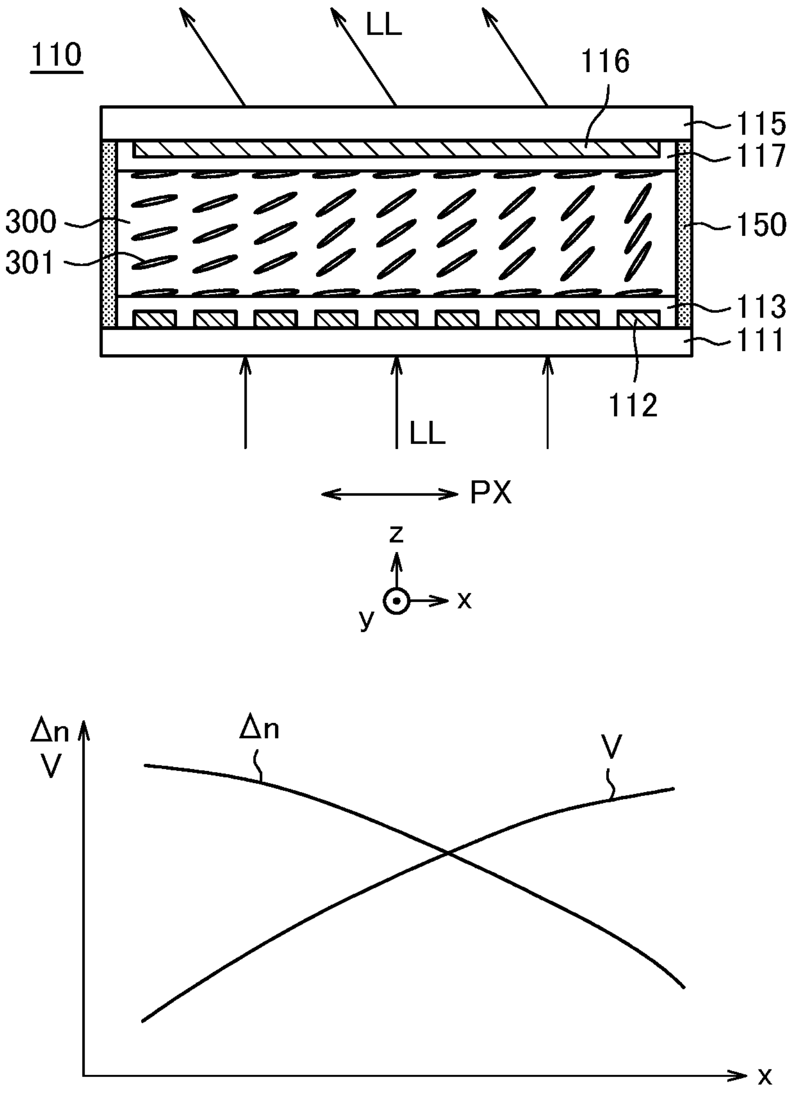
FIG. 22 is a set of figures to show a function of the liquid crystal lens according to embodiment 2.

FIG. 22 is a pair of figures to explain a mechanism how the light is deflected to left hand side. In FIG. 22, the top figure is a cross sectional view of the liquid crystal lens 110. In a first liquid crystal lens 110, a first electrode 112 is formed on a first substrate 111 and a first alignment film 113 is fainted on the first electrode 112; a second electrode 116 is formed on a second substrate 115 and a second alignment film 117 is formed on the second electrode 116. A liquid crystal layer 300 is sandwiched between the first alignment film 113 and the second alignment film 117. The liquid crystal layer 300 is sealed by a sealing material 150.

As shown in the bottom graph in FIG. 22, when voltage v, which becomes larger from left to right, is applied between the first electrode 112 and the second electrode 116, alignment directions of the liquid crystal molecules 310 change according to the positions, thus, effective birefringence Δn of the liquid crystal layer 300 changes as the graph. According to this structure of the liquid crystal layer 300, the light LL which is incident from a bottom of the liquid crystal lens 110 is deflected to a lefthand side direction when it is emitted from the liquid crystal lens 110.

When it is intended to deflect the incident light to righthand side, voltages, applied between the electrodes, are changed to become larger from righthand side to lefthand side as inverse to FIG. 22. Accordingly, the alignment directions of the liquid crystal molecules 301 changes in each of the positions; consequently, effective birefringence Δn conversely changes from the bottom graph in FIG. 22, and thus, the light LL which is incident from a bottom of the liquid crystal lens 110 is deflected to a righthand side direction when it is emitted from the liquid crystal lens 110.

Figure 23:
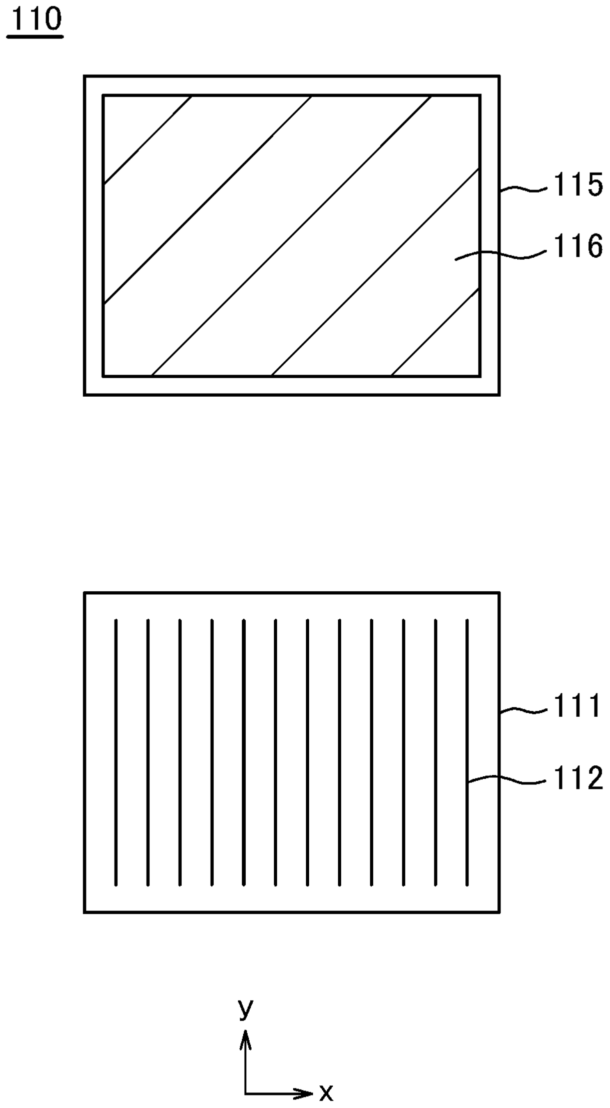
FIG. 23 is a set of plan views of electrode structures of the liquid crystal lens according to embodiment 2.

FIG. 23 is a pair of the plan views to show the structure of electrodes in the first liquid crystal lens 110 corresponding to FIG. 22. Both the first electrode 112 and the second electrode 116 are formed from a transparent electrode as ITO (Indium Tin Oxide). The top figure in FIG. 23 shows a shape of the second electrode 116 famed on the counter substrate 115. The second electrode 116 is formed on the counter substrate 115 in a plane shape as a whole.

The bottom figure in FIG. 23 shows the TFT substrate 111, which has a plurality of striped electrodes 112. In FIG. 23, the stripe electrodes 112 extend in the y direction and are arranged in the x direction. When the liquid crystal lens 110 is in operation, a voltage applied to each of the stripe electrodes 112 changes incrementally or decrementally from one side to another side. In the meantime, even the element electrodes 154 are famed in matrix as shown in FIG. 16, the same effect as in the case of the stripe electrodes can be attained when the element electrodes 154 aligned in one column or in one row are applied with the same voltage.

The structures of the electrodes formed on the TFT substrate 111 and the counter substrate 115 in the first liquid crystal lens 110 are the same for the second liquid crystal lens 120. The first liquid crystal lens 110 and the second liquid crystal lens 120 differ in that: the alignment directions of the first alignment film 113 and the second alignment film 117 in the first liquid crystal lens 110 differ in 90 degrees from the alignment directions of the third alignment film 123 and the second alignment film 127 in the second liquid crystal lens 120.

That is to say, a relation between the alignment directions of the first liquid crystal lens 110 and the alignment directions of the second liquid crystal lens 120 is the same as shown in FIG. 12. A stacking structure of the first liquid crystal lens 110 and the second liquid crystal lens 120, alignment directions of the first alignment film 113 and the third alignment film 123, a relation between the second alignment film 117 and the first alignment film 113, and a relation between the fourth alignment film 127 and the third alignment film 123 are the same as those explained in FIG. 13.

Figure 24:
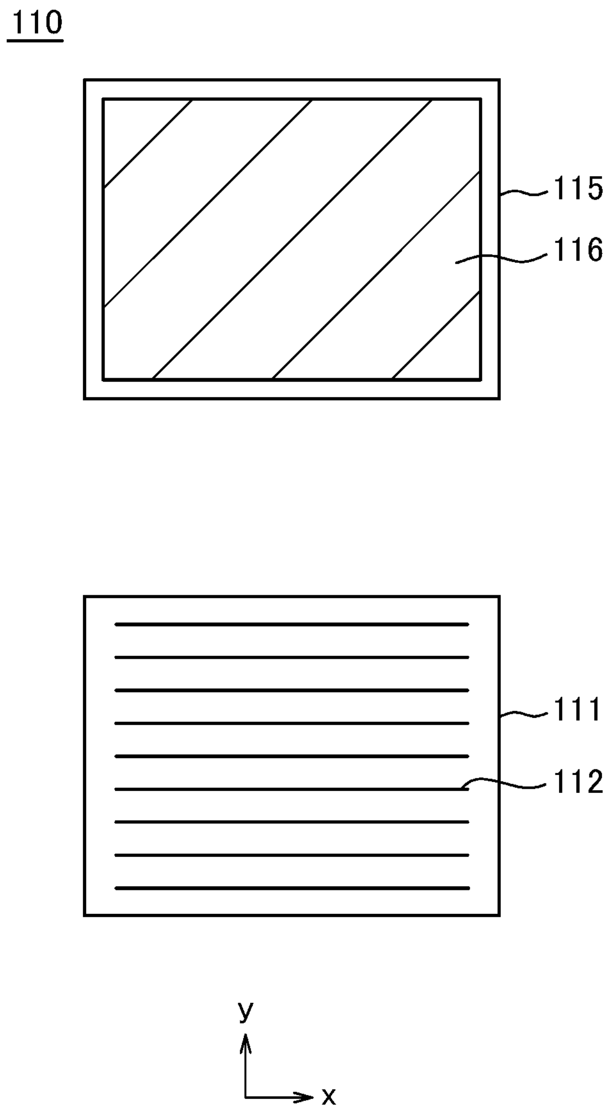
FIG. 24 is another set of plan views of electrode structures of the liquid crystal lens according to embodiment 2.

The electrode structure of the first liquid crystal display device 110 in FIG. 23 is to deflect the light in lefthand side or in righthand side in a plan view. FIG. 24 is the electrode structure to deflect the light in top side or in bottom side in a plan view. In FIG. 24, the second electrode 116 famed on the counter substrate 115 is a plane shape, which is the same as in FIG. 23. The first electrodes 112, formed on the TFT substrate 111 depicted in the bottom in FIG. 24, extend in x direction and are arranged in the y direction; that is to say, it is in an orthogonal relation with the first electrodes 112 in FIG. 23. Therefore, the light is deflected to top direction or bottom direction in a plan view according to the same mechanism as explained in FIG. 22.

Figure 14:
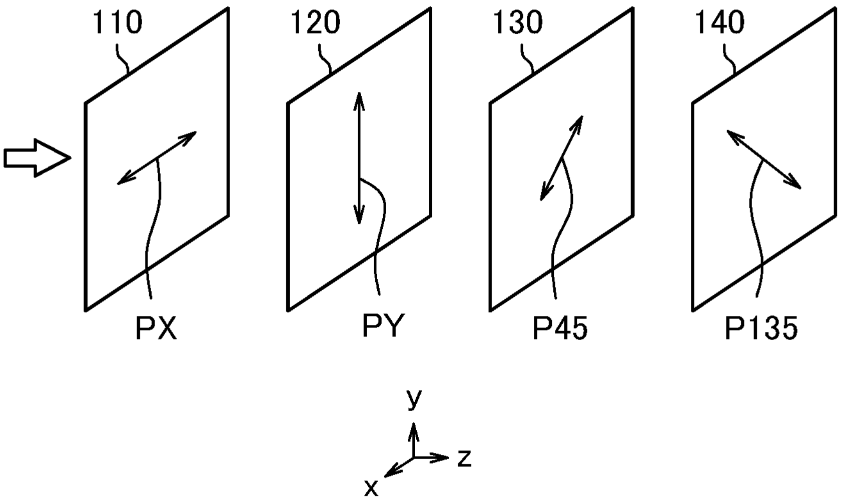
FIG. 14 is a perspective view to show actions of the first liquid crystal lens, the second liquid crystal lens, a third liquid crystal lens and a fourth liquid crystal lens.

As explained above, the light can be deflected in lefthand side and righthand side or in top side and bottom side in a plan view using the liquid crystal lens having the electrode structure shown in FIG. 23 and the liquid crystal lens having the electrode structure shown in FIG. 24. In the meantime, if more thorough liquid crystal lens action is needed in the deflection, four liquid crystal lenses can be used for each of the lens set for the lefthand and righthand directions in a plan view and the lens set for the upper and bottom directions in a plan view as shown in FIG. 14.

Embodiment 3

Figure 25:
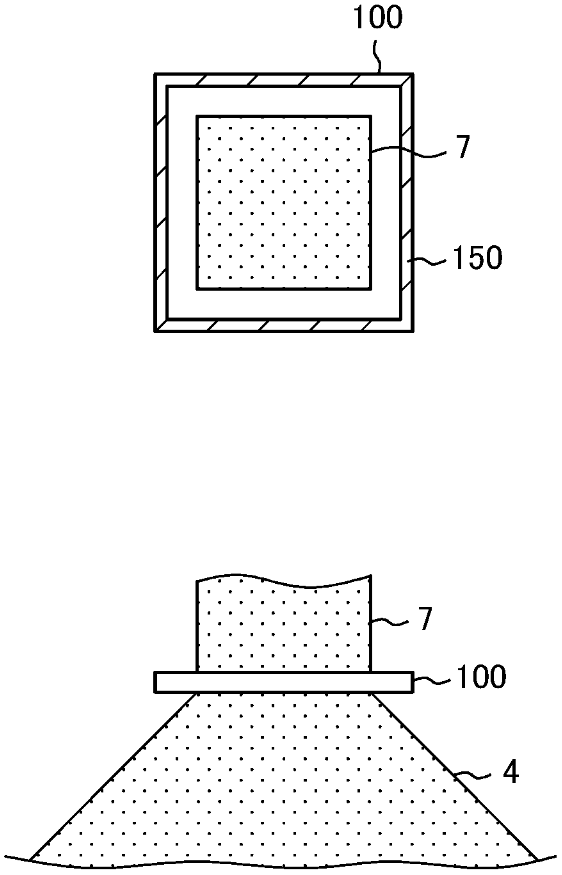
FIG. 25 is a set of a plan view and a cross sectional view to show a lens action according to embodiment 3.

In embodiment 1, a cross section of the light 7 which is incident to the liquid crystal lens 100, is circle. Therefore, a light spot on the irradiation surface looks like an oval, elongated in horizontal direction or vertical direction. The liquid crystal lens 100 can make a divergent or convergent action to the incident light; however, it is difficult to change a shape of the light spot by the liquid crystal lens 100. The top figure in FIG. 25 is a plan view in which a cross section of the incident light 7 to the liquid crystal lens 100 is rectangle. The bottom figure is a cross sectional view which shows the incident light 7 gets a divergent effect from the liquid crystal lens 100 and is emitted as a divergent emitting light 4.

Figure 26:
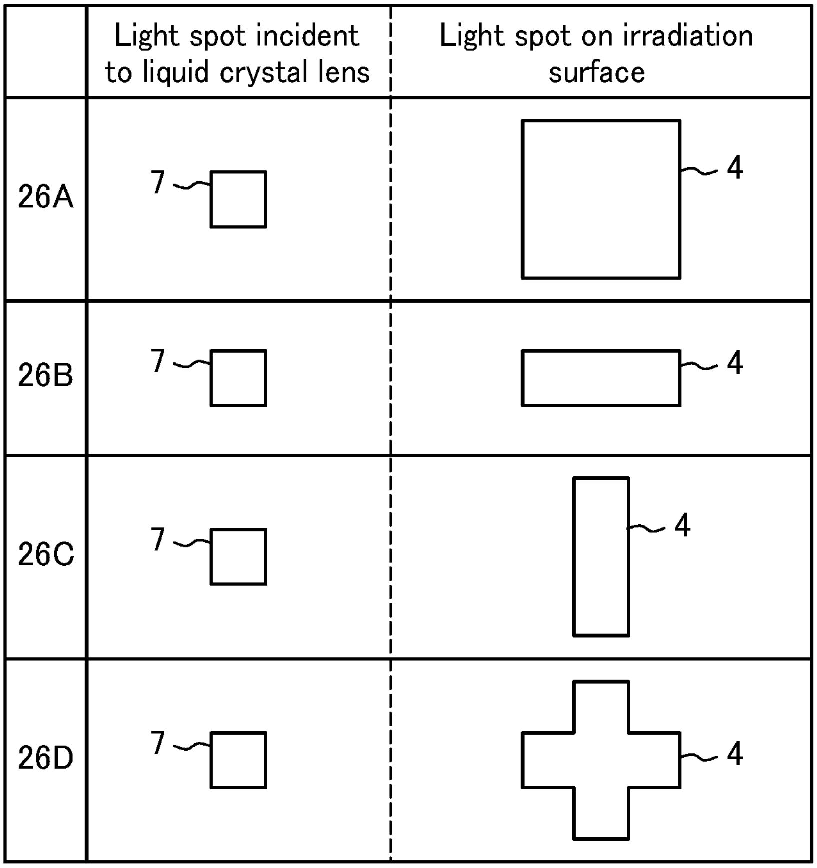
FIG. 26 is a table to show various lens actions according to the liquid crystal lens of embodiment 3.

The table in FIG. 26 shows examples that a rectangle light spot 7 incident to the liquid crystal lens 100 gets lens action from the liquid crystal lens 100 and is changed in various light spot shapes. The lens action of the liquid crystal lens 100 in FIG. 26 is the same as that explained in FIG. 15, however, since incident light 7 is rectangle, the irradiated light spot 4 also is a sharper rectangle. In FIG. 26, 26A is to change a small rectangle to a large rectangle, 26B is to elongate the light spot only in horizontal direction, 26C is to elongate the light spot only in vertical direction, and 26D is to elongate the light spot in cross shape.

Figure 27:
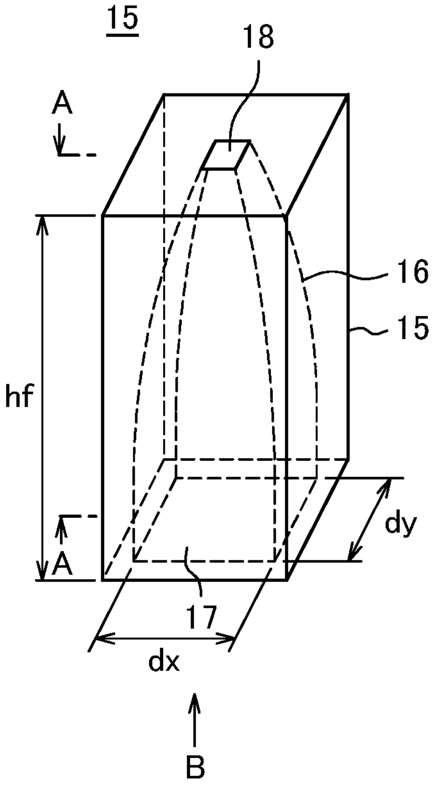
FIG. 27 is a perspective view of a funnel shaped reflector according to embodiment 3.

FIG. 27 is a perspective view of the funnel shaped reflector 15 which supplies rectangle light to the liquid crystal lens 100. The funnel shaped reflector 15 of FIG. 27 differs from the funnel shaped reflector 10 of FIG. 6 in that the opening 17 and the hole 18 for the LED are rectangle in FIG. 27. Accordingly, the light spot of the emitting light from the funnel shaped reflector 15 can be made rectangle.

Figure 28:
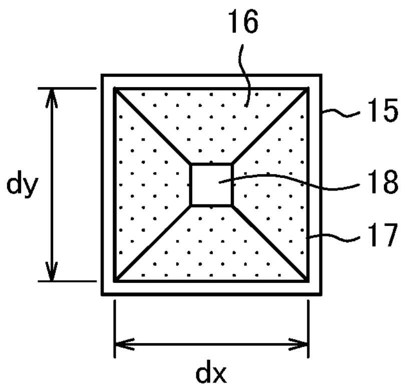
FIG. 28 is a bottom view when the funnel shaped reflector according
Figure 29:
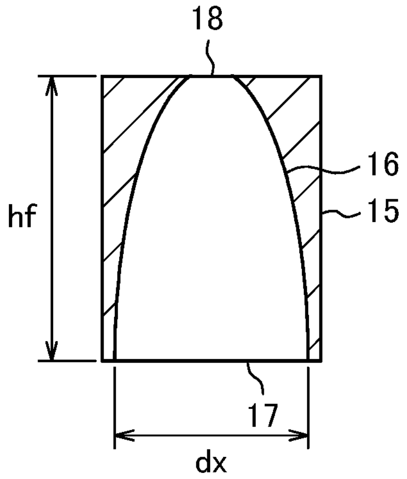
FIG. 29 is a cross sectional view of FIG. 27 along the line A-A.

FIG. 28 is a bottom view of FIG. 27 in which the funnel shaped reflector 15 in FIG. 27 is viewed from B direction. As shown in FIG. 28, the opening 17 of the funnel shaped reflector 15 is rectangle, consequently, a light spot of the emitting light becomes a shape corresponding to a rectangle of the opening 17. FIG. 29 is a cross sectional view of the funnel shaped reflector 15 in FIG. 27 along the line A-A. The hole 18 for the LED and the opening 17 are connected with each other by curved surface 16, at least a part of the curved surface 16 is a parabolic surface. As a result, a collimated and cross sectionally rectangle light beam is emitted from the opening 17.

An aspect ratio, which is a ratio between a height hf of the funnel shaped reflector 15 and a diameter of the opening 17, can be defined as follows. If the opening 17 is square, the aspect ratio is hf/(dx or dy); if the opening is rectangle, the aspect ratio is hf/(lager one of dx and dy). The aspect ratio is preferably 2 or more, more preferably, 3 or more, and yet more preferably 4 or more.

As described above, a compact lighting device which can set the shape of light spot optionally can be realized according to the present invention.

What is claimed is:

1. A lighting device comprising:

a funnel shaped reflector including a first hole in which a light source is disposed, a second hole which emits light, and a reflecting curved surface connecting the first hole and the second hole with each other, a first direction being defined as a direction of a line connecting a center of the first hole and a center of the second hole with each other;

a reflection plate, being disposed to oppose to the second hole of the funnel shaped reflector, major surface of the reflection plate being tilted with a first angle with respect to the first direction; and a liquid crystal lens including an incident surface and opposing to the reflection plate, a major surface of the incident surface being tilted to the major surface of the reflection plate with a second angle, wherein light emitted from the funnel shaped reflector is reflected at the reflection plate, and is emitted from the liquid crystal lens.

2. The lighting device according to claim 1, wherein the first angle is 45 degrees.

3. The lighting device according to claim 1, wherein the second angle is 45 degrees.

4. The lighting device according to claim 1, wherein an outer shape of the funnel shaped reflector is rectangular, the first hole is famed on a first surface of the rectangular, the second hole is famed on a second surface, which opposes to the first surface, the first hole is smaller than a second hole, the first hole and the second hole are connected by a curved surface, and at least a part of the curved surface is a parabolic curved surface.

5. The lighting device according to claim 4, wherein the second hole of the funnel shaped reflector is circle.

6. The lighting device according to claim 4, wherein the second hole of the funnel shaped reflector is rectangle.

7. The lighting device according to claim 5, wherein, in the funnel shaped reflector, a distance between the first surface and the second surface is twice or more of a diameter of the second hole.

8. The lighting device according to claim 6, wherein the second hole of the funnel shaped reflector is square, and a distance between the first surface and the second surface is twice or more of a length of a side of the second hole.

9. The lighting device according to claim 1, wherein the liquid crystal lens includes a first liquid crystal lens, a second liquid crystal lens, a third liquid crystal lens, and a fourth liquid crystal lens.

10. The lighting device according to claim 9, wherein each of the first liquid crystal lens, the second liquid crystal lens, the third liquid crystal lens, and the fourth liquid crystal lens acts to incident light polarized in different directions.

11. The lighting device according to claim 9, wherein each of the first liquid crystal lens, the second liquid crystal lens, the third liquid crystal lens, and the fourth liquid crystal lens has a divergent action or a convergent action to incident light.

12. The lighting device according to claim 9, wherein each of the first liquid crystal lens, the second liquid crystal lens, the third liquid crystal lens, and the fourth liquid crystal lens has a divergent action to incident light in certain direction, and does not have a divergent action in a direction orthogonal to the certain direction.

13. The lighting device according to claim 9, wherein each of the first liquid crystal lens, the second liquid crystal lens, the third liquid crystal lens, and the fourth liquid crystal lens has a deflection action to a certain direction.

* * * * *